(12) United States Patent
Cheng

(10) Patent No.: US 12,222,585 B2
(45) Date of Patent: Feb. 11, 2025

(54) GLASSES TYPE DISPLAY DEVICE

(71) Applicant: HTC Corporation, Taoyuan (TW)

(72) Inventor: Tung-Ting Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/484,457

(22) Filed: Oct. 11, 2023

(65) Prior Publication Data

US 2024/0192521 A1    Jun. 13, 2024

Related U.S. Application Data

(60) Provisional application No. 63/432,041, filed on Dec. 12, 2022.

(51) Int. Cl.
*G02C 5/22*     (2006.01)

(52) U.S. Cl.
CPC ..................... *G02C 5/22* (2013.01)

(58) Field of Classification Search
CPC ........ G02C 5/22; G02C 11/10; G02C 5/2209; G02C 5/14; G02B 27/0176; G02B 2027/0178
See application file for complete search history.

(56) References Cited

U.S. PATENT DOCUMENTS

| | | | | |
|---|---|---|---|---|
| 5,764,330 A | * | 6/1998 | Simioni | G02C 5/2209 351/149 |
| 6,007,198 A | * | 12/1999 | Burton | G02C 9/02 351/41 |
| 6,163,926 A | * | 12/2000 | Watanabe | G02C 5/22 351/153 |
| 10,761,346 B1 | | 9/2020 | Yang et al. | |
| 2002/0118336 A1 | * | 8/2002 | Thiele | G02C 5/22 351/111 |

(Continued)

FOREIGN PATENT DOCUMENTS

| CN | 2784967 | 5/2006 |
|---|---|---|
| CN | 210123499 | 3/2020 |

(Continued)

OTHER PUBLICATIONS

"Office Action of Taiwan Counterpart Application", issued on Jul. 3, 2024, p. 1-p. 6.

*Primary Examiner* — David M Upchurch
(74) *Attorney, Agent, or Firm* — JCIPRNET (57) ABSTRACT

A glasses type display device includes a front-end assembly, first and second temples, a pivot assembly, and a wire. The first temple is pivotally connected to the front-end assembly. The pivot assembly is between the front-end assembly and the second temple to pivotally connect the two. The pivot assembly includes first and second connecting portions respectively having first upper and lower pivot portions and second upper and lower pivot portions and connected to the front-end assembly and the second temple. The first and second upper pivot portions cooperate and the first and second lower pivot portions cooperate on a pivot axis, so that the second connecting portion is pivoted relative to the first connecting portion on the pivot axis. The wire is extended from the front-end assembly via a space between the first or second upper pivot portion and the first or second lower pivot portion to the second temple.

5 Claims, 6 Drawing Sheets

(56) References Cited

U.S. PATENT DOCUMENTS

| | | | | |
|---|---|---|---|---|
| 2010/0208193 A1* | 8/2010 | Dollay | ................... | G02C 1/08 |
| | | | | 351/95 |
| 2011/0096288 A1* | 4/2011 | LaGace | ............... | G02C 5/2209 |
| | | | | 351/153 |
| 2013/0141692 A1* | 6/2013 | Crosby | ................ | G02C 7/088 |
| | | | | 351/159.48 |

FOREIGN PATENT DOCUMENTS

| | | |
|---|---|---|
| CN | 211577564 | 9/2020 |
| WO | 2020164446 | 8/2020 |

\* cited by examiner

GLASSES TYPE DISPLAY DEVICE

CROSS-REFERENCE TO RELATED APPLICATION

This application claims the priority benefit of U.S. provisional application Ser. No. 63/432,041, filed on Dec. 12, 2022. The entirety of the above-mentioned patent application is hereby incorporated by reference herein and made a part of this specification.

BACKGROUND

Technical Field

The present application relates to a display device, and in particular to a glasses type display device.

Description of Related Art

Currently, the more common type of display device used in virtual reality is a head mounted display device. One common type of head mounted display device is a glasses type display device having foldable temples that may significantly reduce storage space, which is beneficial to portability.

SUMMARY

The present application provides a glasses type display device having foldable temples to reduce storage space.

A glasses type display device of the present application includes a front-end assembly, a first temple, a second temple, a pivot assembly, and a wire. The first temple is pivotally connected to the front-end assembly. The pivot assembly is arranged between the front-end assembly and the second temple, so as to pivotally connect the second temple to the front-end assembly. The pivot assembly includes a first connecting portion and a second connecting portion. The first connecting portion is connected to one of the front-end assembly and the second temple, and has a first upper pivot portion and a first lower pivot portion. The second connecting portion is connected to the other of the front-end assembly and the second temple, and has a second upper pivot portion and a second lower pivot portion. The first upper pivot portion and the second upper pivot portion cooperate with each other on a pivot axis, and the first lower pivot portion and the second lower pivot portion cooperate with each other on the pivot axis, so that the second connecting portion is pivoted relative to the first connecting portion on the pivot axis. The wire is extended from the front-end assembly via a space between the first upper pivot portion or the second upper pivot portion and the first lower pivot portion or the second lower pivot portion to reach the second temple.

Based on the above, in the present application, dividing the pivoting shaft body into two spaced portions allows the wire to be extended through, thus helping to reduce the appearance size and allowing the wire to be bent naturally to extend the service life thereof.

DESCRIPTION OF THE EMBODIMENTS

Figure 1:
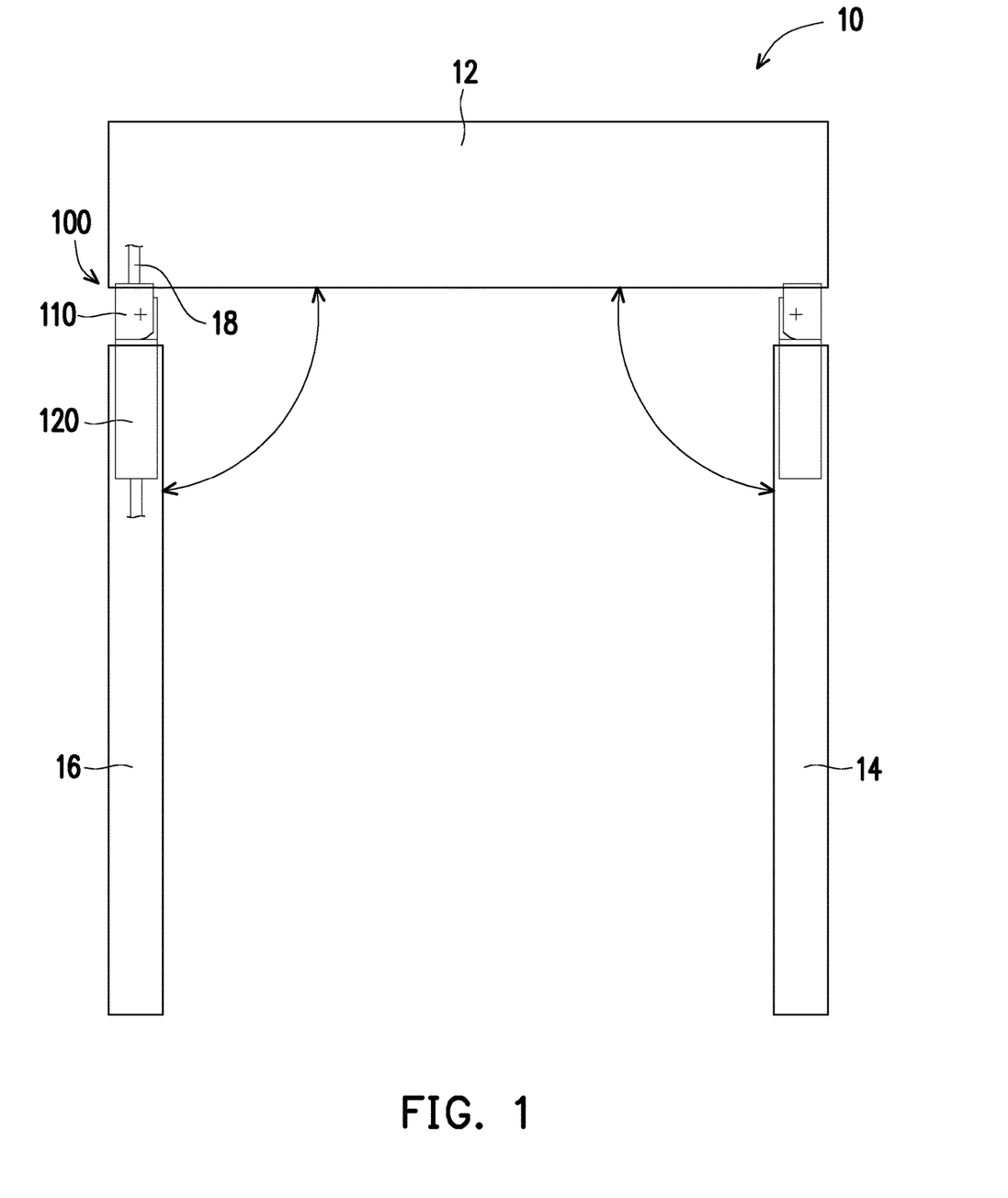
FIG. 1 is a schematic diagram of a glasses type display device according to an embodiment of the invention.

Please refer to FIG. 1. In an embodiment of the invention, a glasses type display device 10 includes a front-end assembly 12. The front-end assembly 12 may include members such as an optical system (not shown) and a protective shell, and may be provided with a display or be suitable for placing a display. The display may be a built-in display or an external portable display (such as a smart phone, etc.), but not limited thereto. The type of the display may be adjusted according to the application of the glasses type display device 10 in a virtual reality system, an augmented reality system, or a mixed reality system. The optical system includes an optical element used to change the optical path of the display, such as a lens, a light guide element, or a prism.

Please refer to FIG. 1 again. The glasses type display device 10 further includes a first temple 14, a second temple 16, and a pivot assembly 100. The first temple 14 is pivotally connected to the front-end assembly 12. The pivot assembly 100 is arranged between the front-end assembly 12 and the second temple 16, so as to pivotally connect the second temple 16 to the front-end assembly 12. In the present embodiment, the first temple 14 may be pivotally connected to the front-end assembly 12 via a traditional pivoting mechanism, but not limited thereto. In addition, for power supply or signal transmission needs, the glasses type display device 10 further includes a wire 18. The wire 18 is extended from the front-end assembly 12 through the pivot assembly 100 to reach the second temple 16. The wire 18 is, for example, a cable or a flexible circuit board (FPC).

Figure 2:
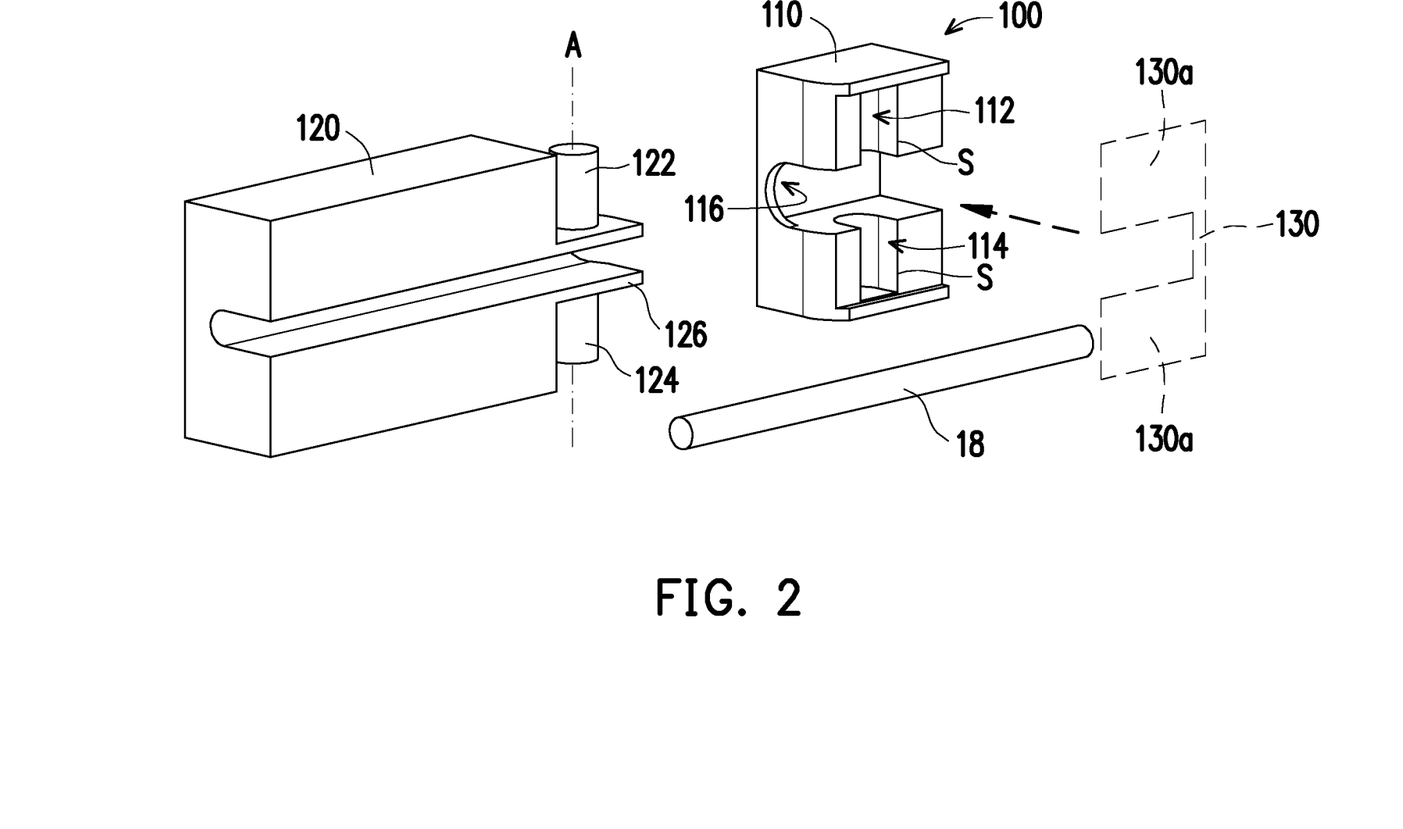
FIG. 2 is an exploded view of the pivot assembly of FIG. 1.
Figure 3:
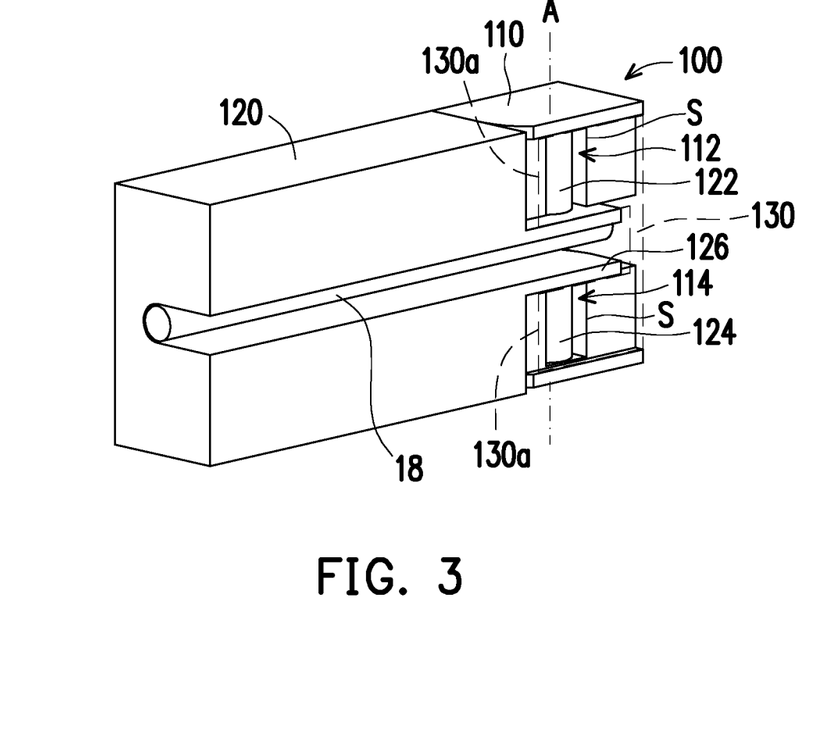
FIG. 3 is an assembled view of the pivot assembly of FIG. 2.

Please refer to FIG. 2 and FIG. 3. In the present embodiment, the pivot assembly 100 includes a first connecting portion 110 and a second connecting portion 120. The first connecting portion 110 is connected to one of the front-end assembly 12 and the second temple 16 (the front-end assembly 12 is taken as an example in the present embodiment). The second connecting portion 120 is connected to the other of the front-end assembly 12 and the second temple 16 (the second temple 16 is taken as an example in the present embodiment). The material of the first connecting portion 110 and the second connecting portion 120 may be plastic to achieve lightweight effect, but not limited thereto.

In the present embodiment, the first connecting portion 110 has a first upper pivot portion 112 and a first lower pivot portion 114. The second connecting portion 120 has a second upper pivot portion 122 and a second lower pivot portion 124. The first upper pivot portion 112 and the second upper pivot portion 122 cooperate with each other on a pivot axis A, and the first lower pivot portion 114 and the second lower pivot portion 124 cooperate with each other on the pivot axis A, so that the second connecting portion 120 is pivoted relative to the first connecting portion 110 on the pivot axis A. The wire 18 is extended from the front-end assembly 12 through a space between the first upper pivot portion 112 or the second upper pivot portion 122 and the first lower pivot portion 114 or the second lower pivot portion 124 to reach the second temple 16.

In the present embodiment, the first upper pivot portion 112 and the second upper pivot portion 122 are respectively a shaft hole and a shaft body that cooperate with each other, and the first lower pivot portion 114 and the second lower pivot portion 124 are respectively another shaft hole and another shaft body that cooperate with each other. Specifically, the first upper pivot portion 112 and the first lower pivot portion 114 may be shaft holes, and the second upper pivot portion 122 and the second lower pivot portion 124 may be shaft bodies, but not limited thereto. In another embodiment not shown, the first upper pivot portion 112 and the second lower pivot portion 124 may be shaft holes, and the second upper pivot portion 122 and the first lower pivot portion 114 may be shaft bodies. In another embodiment not shown, the first upper pivot portion 112 and the second lower pivot portion 124 may be shaft bodies, and the second upper pivot portion 122 and the first lower pivot portion 114 may both be shaft holes. In the above embodiment, when one of the first upper pivot portion 112, the second upper pivot portion 122, the first lower pivot portion 114, and the second lower pivot portion 124 is a shaft body, the projection of the wire 18 on the pivot axis A toward the shaft body (i.e., the first upper pivot portion 112, the second upper pivot portion 122, the first lower pivot portion 114, or the second lower pivot portion 124) falls on the shaft body. The above situation may be seen in the embodiment in FIG. 6, that is, the projection of the wire 18 on the pivot axis A toward the shaft body (i.e., the second upper pivot portion 122) falls on the shaft body, but not limited thereto.

In the present embodiment, when the first upper pivot portion 112 and the first lower pivot portion 114 are shaft holes, and the second upper pivot portion 122 and the second lower pivot portion 124 are shaft bodies, each of the shaft holes (i.e., the first upper pivot portion 112 and the first lower pivot portion 114) has a lateral opening S. The shaft bodies (i.e., the second upper pivot portion 122 and the second lower pivot portion 124) respectively enter the shaft holes (i.e., the first upper pivot portion 112 and the first lower pivot portion 114) via the lateral openings S. In addition, the pivot assembly 100 also includes a limiting member 130, which is only shown in FIG. 2 and FIG. 3. The limiting member 130 includes a plurality of limiting portions 130a. The limiting portions 130a respectively close the lateral openings S to respectively limit the shaft bodies (i.e., the second upper pivot portion 122 and the second lower pivot portion 124) in the shaft holes (i.e., the first upper pivot portion 112 and the first lower pivot portion 114). In another embodiment not shown, the lateral openings S may form a necking structure, so that the shaft bodies (i.e., the second upper pivot portion 122 and the second lower pivot portion 124) are respectively forced to enter the shaft holes (i.e., the first upper pivot portion 112 and the first lower pivot portion 114) via the lateral openings S and limited in the shaft holes (i.e., the first upper pivot portion 112 and the first lower pivot portion 114).

Figure 5A:
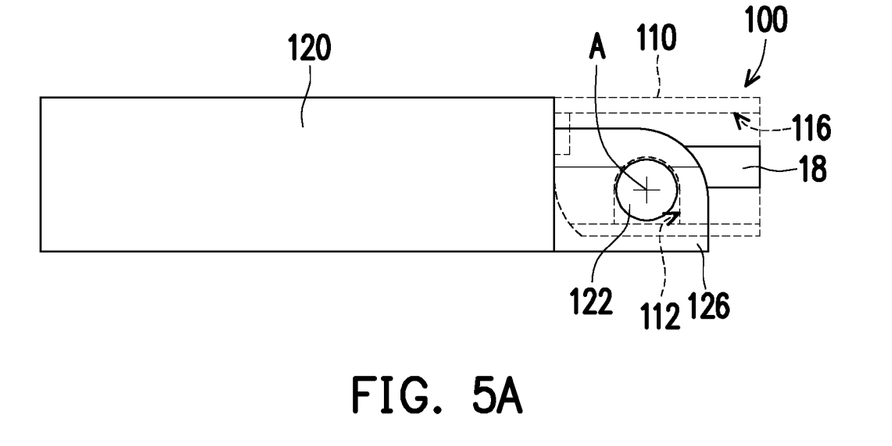
FIG. 5A is a top view of the pivot assembly of FIG. 1 in a closed state.
Figure 5B:
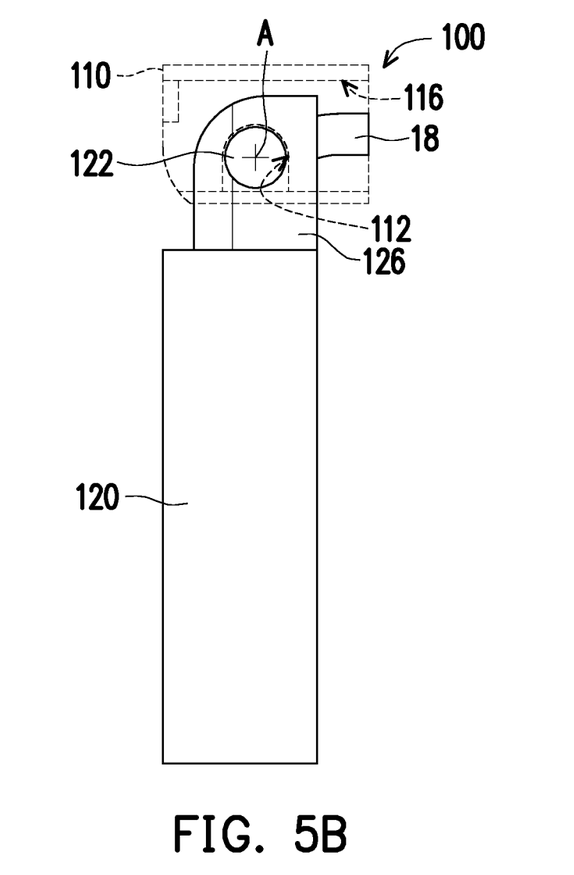
FIG. 5B is a top view of the pivot assembly of FIG. 5A in a closed state.
Figure 6:
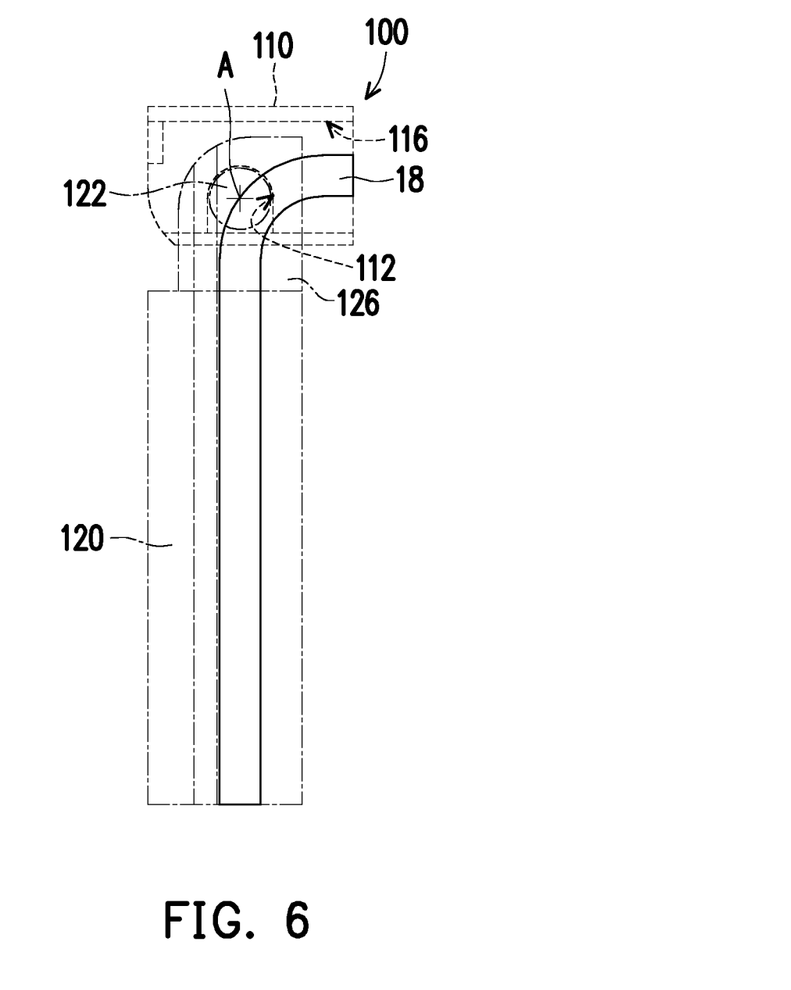
FIG. 6 is a top view of the pivot assembly of FIG. 5B showing a bent state of a wire.

In FIG. 5A and FIG. 5B, the first connecting portion 110 is presented in a transparent and dotted manner. In FIG. 6, the first connecting portion 110 and the second connecting portion 120 are presented in transparent and different broken line manners.

Figure 4A:
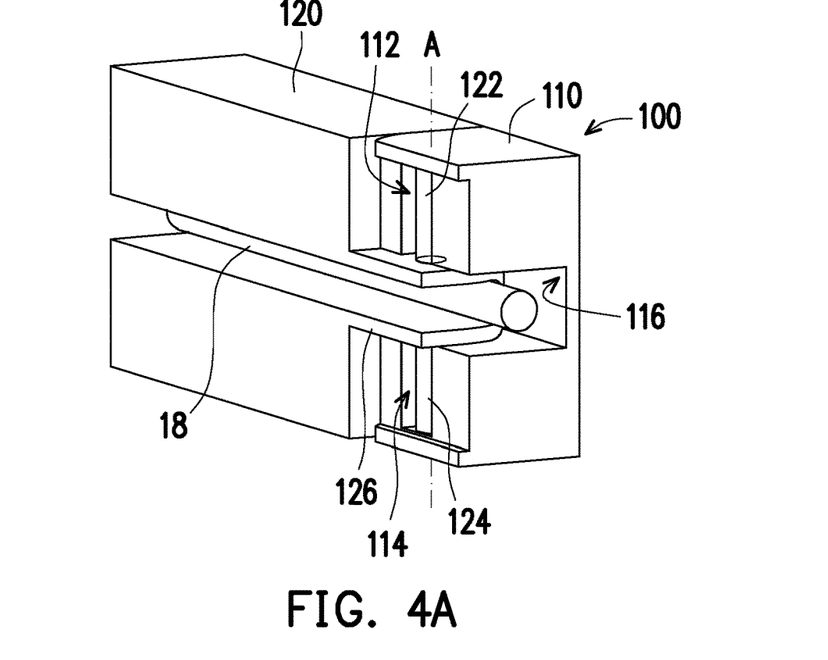
FIG. 4A is a perspective view of the pivot assembly of FIG. 1 in an open state.
Figure 4B:
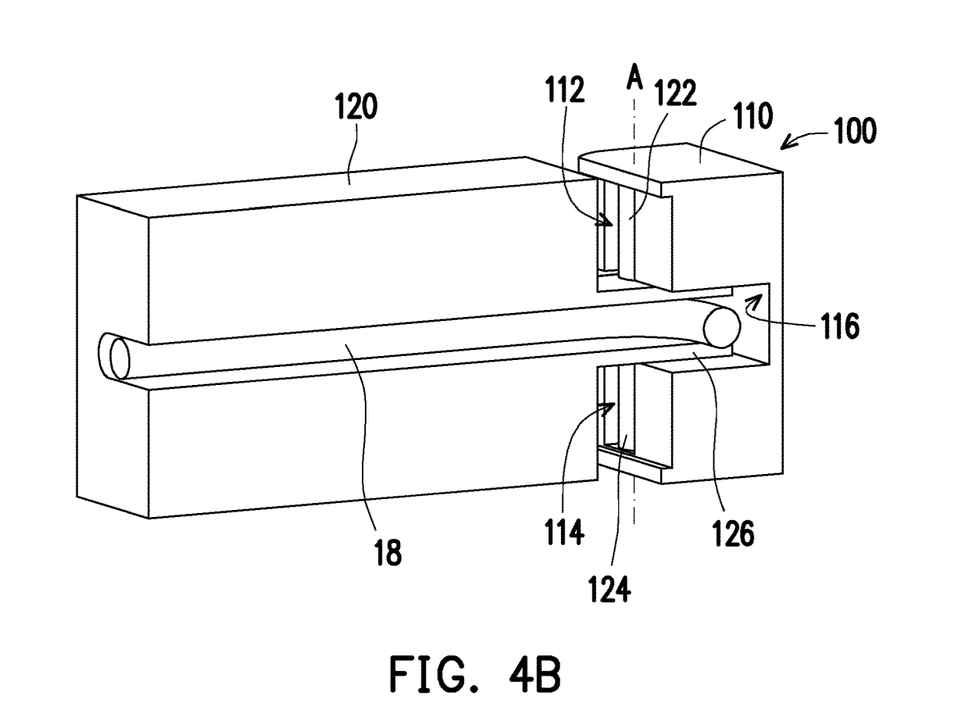
FIG. 4B is a perspective view of the pivot assembly of FIG. 4A in an open state.

In the present embodiment, the second connecting portion 120 of the pivot assembly 100 in the open state of FIG. 4A and FIG. 5A may be pivoted to the closed state of FIG. 4B and FIG. 5B relative to the first connecting portion 110 via force application relative to the first connecting portion 110 and via the cooperation between the first upper pivot portion 112 and the second upper pivot portion 122 and the cooperation between the first lower pivot portion 114 and the second lower pivot portion 124, so that the second temple 16 of FIG. 1 may be folded close to the front-end assembly 12 in response to the relative pivot between the first connecting portion 110 and the second connecting portion 120. At the same time, the wire 18 may be naturally bent in response to the pivot between the first connection portion 110 and the second connection portion 120, as shown in FIG. 6. Specifically, since the wire 18 is extended in the space between the shaft bodies without extending against the shaft bodies, the section of the wire 18 originally wound around the shaft body is no longer pulled during the pivoting process and may be naturally bent, thus extending the service life of the wire 18.

Please refer to FIG. 2 and FIG. 3. In the present embodiment, the first connecting portion 110 may have a groove 116. The second connecting portion 120 may have a groove shell 126. The groove shell 126 may be located within groove 116. The wire 18 may be extended within the groove shell 126. The first upper pivot portion 112 and the first lower pivot portion 114 may be located at two sides of the groove 116. The second upper pivot portion 122 and the second lower pivot portion 124 may be located at two sides of the groove shell 126. The groove shell 126 may be moved within the groove 116 in response to the pivot between the first connecting portion 110 and the second connecting portion 120.

Based on the above, in the present application, dividing the pivoting shaft body into two spaced portions allows the wire to be extended through, thus helping to reduce the appearance size and allowing the wire to be bent naturally to extend the service life thereof.

What is claimed is:

1. A glasses type display device, comprising:
  a front-end assembly;
  a first temple pivotally connected to the front-end assembly;
  a second temple;
  a pivot assembly provided between the front-end assembly and the second temple to pivotally connect the second temple to the front-end assembly, the pivot assembly comprising:
    a first connecting portion connected to one of the front-end assembly and the second temple, and having a first upper pivot portion and a first lower pivot portion; and
    a second connecting portion connected to the other of the front-end assembly and the second temple, and having a second upper pivot portion and a second lower pivot portion, wherein the first upper pivot portion and the second upper pivot portion cooperate with each other on a pivot axis, and the first lower pivot portion and the second lower pivot portion cooperate with each other on the pivot axis, so that the second connecting portion is pivoted relative to the first connecting portion on the pivot axis; and
  a wire extended from the front-end assembly through a space between the first upper pivot portion or the second upper pivot portion and the first lower pivot portion or the second lower pivot portion to reach the second temple,
  wherein the first upper pivot portion and the second upper pivot portion are respectively a shaft hole and a shaft body that cooperate with each other, and the first lower pivot portion and the second lower pivot portion are respectively another shaft hole and another shaft body that cooperate with each other,
wherein each of the shaft holes has a lateral opening, the shaft bodies respectively enter the shaft holes via the lateral openings, the pivot assembly also comprises a limiting member, the limiting member comprises a plurality of limiting portions, and the limiting portions respectively close the lateral openings to respectively limit the shaft bodies in the shaft holes.

2. The glasses type display device of claim 1, wherein the wire is naturally bent in response to a pivot between the first connecting portion and the second connecting portion.

3. The glasses type display device of claim 1, wherein the wire is a cable or a flexible circuit board.

4. The glasses type display device of claim 1, wherein one of the first upper pivot portion, the second upper pivot portion, the first lower pivot portion, and the second lower pivot portion is a shaft body, and a projection of the wire on the pivot axis toward the shaft body falls on the shaft body.

5. The glasses type display device of claim 1, wherein the first connecting portion has a groove, the second connecting portion has a groove shell, the groove shell is located in the groove, the wire is extended into the groove shell, the first upper pivot portion and the first lower pivot portion are located at two sides of the groove, and the second upper pivot portion and the second lower pivot portion are located at two sides of the groove shell.

* * * * *